H. C. GIBSON.
DETACHABLE WHEEL RIM.
APPLICATION FILED MAR. 17, 1908.

1,087,534.

Patented Feb. 17, 1914.
2 SHEETS—SHEET 1.

Witnesses:

Inventor
Hugo C. Gibson
By his Attorneys

H. C. GIBSON.
DETACHABLE WHEEL RIM.
APPLICATION FILED MAR. 17, 1908.

1,087,534.

Patented Feb. 17, 1914.
2 SHEETS—SHEET 2.

Witnesses:
Raphaël Petter
A. C. Fischmer Jr.

Inventor
Hugo C. Gibson
By his Attorneys
Townsend & Sucker

UNITED STATES PATENT OFFICE.

HUGO C. GIBSON, OF NEW YORK, N. Y., ASSIGNOR TO THE FIRESTONE TIRE & RUBBER COMPANY, OF AKRON, OHIO, A CORPORATION OF OHIO.

DETACHABLE WHEEL-RIM.

1,087,534.  Specification of Letters Patent.  Patented Feb. 17, 1914.

Application filed March 17, 1908. Serial No. 421,617.

*To all whom it may concern:*

Be it known that I, HUGO C. GIBSON, a subject of the King of Great Britain, and a resident of New York, in the county of New York and State of New York, have invented certain new and useful Improvements in Detachable Wheel-Rims, of which the following is a specification.

My present invention relates to means for detachably securing tires to vehicle wheels and more particularly to that class of devices in which a metallic rim carrying a pneumatic tire is detachably secured to the felly of the wheel by clamping means secured to the felly.

The object of my invention is to provide means of low cost to manufacture which will be simple in construction and efficient in operation so that a tire-holding rim will be firmly held to the wheel and at the same time be capable of being quickly removed and replaced.

My invention consists in the improved combination of detachable or demountable wheel-rim and clamping means for securing them to the wheel hereinafter set forth in the claims.

My invention also consists in securing an annular projecting flange to the wheel on one side, said flange being adapted to engage the upturned surface of the rim on one side and mounting on fixed fulcrum points on the other side of the wheel a plurality of individual levers which engage the other side of the rim on its upturned surface in combination with means for applying pressure to the levers to clamp the rim between them and the opposite flange.

My invention consists further in the details of construction and combinations of parts hereinafter more particularly described and then specified in the claims.

Figure 1:
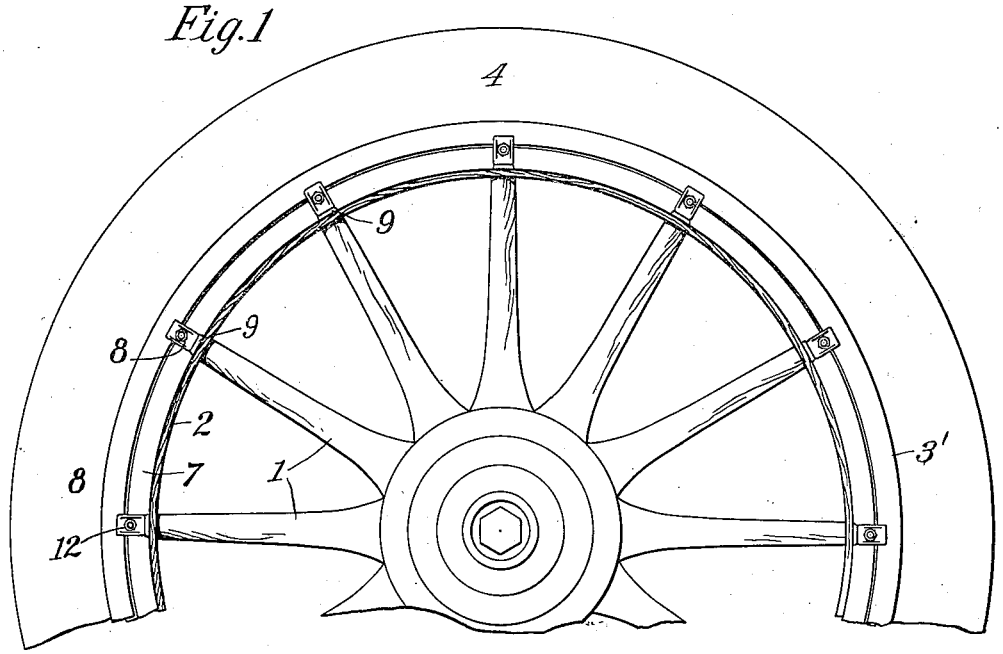
Figure 2:
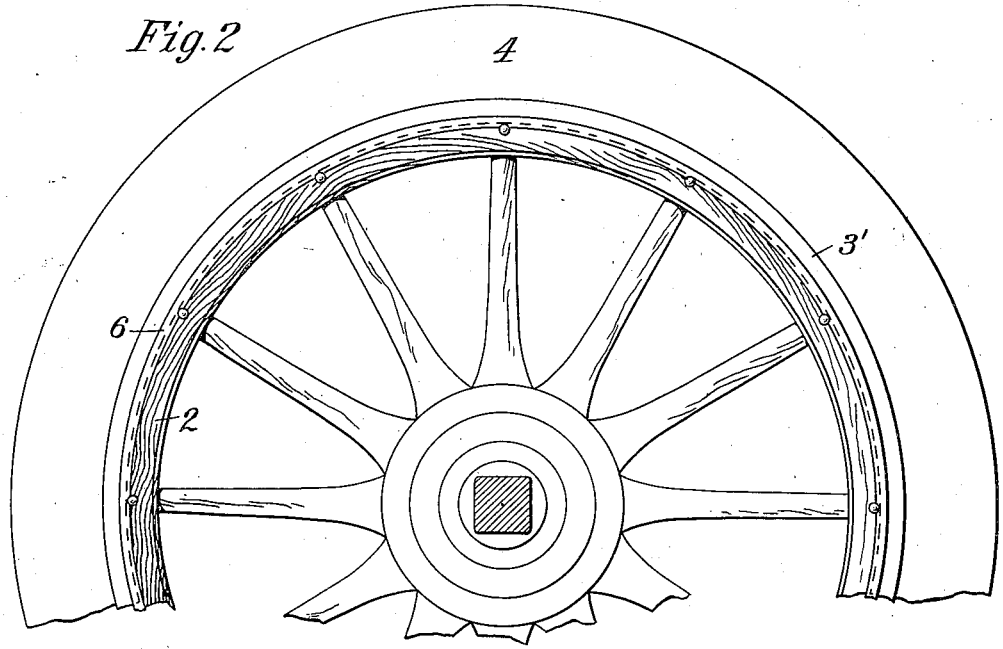
Figure 3:
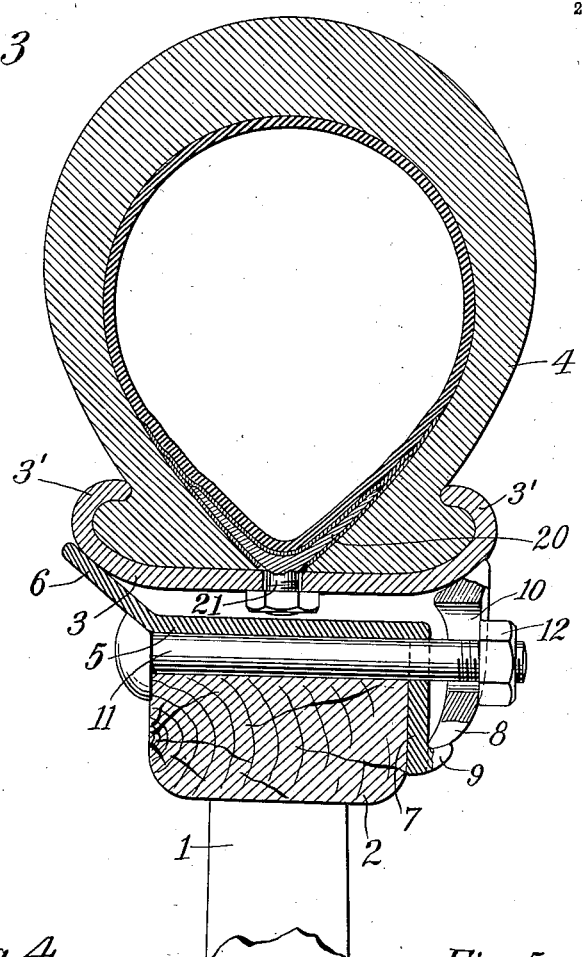
Figure 4:
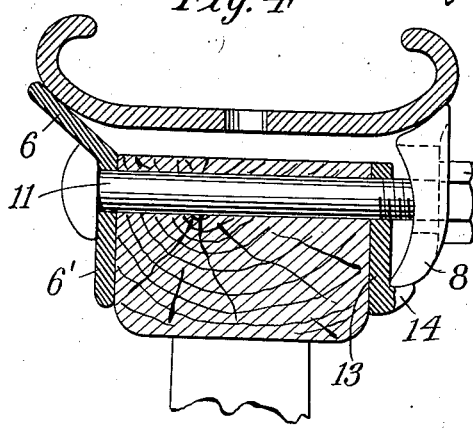
Figure 5:
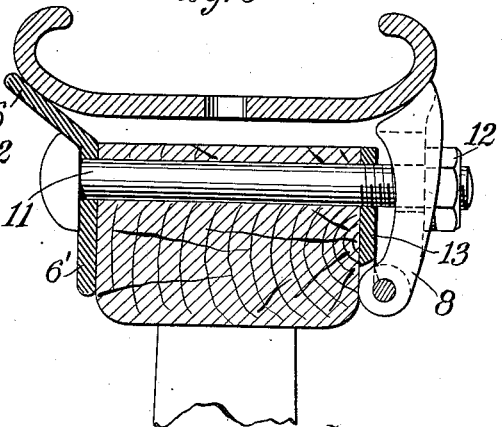

In the accompanying drawings, Figure 1 is a side elevation of a vehicle wheel having my invention applied thereto. Fig. 2 is a side elevation of the other side of the wheel. Fig. 3 is an enlarged transverse vertical section through the same. Fig. 4 is a similar section through a modification in the form of carrying out my invention. Fig. 5 illustrates a further modification.

Referring to the drawings, 1 indicates the spokes of the wheel provided with the usual felly or fixed rim 2, while 3 indicates a rim of the standard clencher type provided with the usual upturned flanges or grips 3′ which grip and hold the tire cover 4 as usual in the art. The tire 4 is held in the rim by the usual spreaders 20, but preferably instead of long lugs as is usual in the art, I employ short lugs 21, the tightening nuts of which are located between the felly or fixed rim 2 and the detachable rim 3. It will be obvious that long lugs might be employed if desirable by cutting grooves in the side of the felly to accommodate them when the rim is placed on the wheel.

In the preferred form of carrying out my invention, a circumferential band 5 is shrunk onto or otherwise suitably secured to the periphery of the felly 2. One edge of the band 5 terminates in an outwardly projecting annular flange 6 which engages the periphery of the rim 3 on its upturned surface 3′. The opposite edge of the band terminates in a centripetally projecting or depending annular flange 7 preferably integral therewith and which seats against the side of the felly 2.

A series of levers 8 preferably loosely fulcrumed upon lateral projections or ledges 9 preferably integral with the centripetally projecting flange 7 engage the periphery of the upturned surface of the rim with their free ends at a plurality of places about its circumference and on the opposite side to the flange 6. A bolt 11 preferably passing through the felly of the wheel and through a slot 10 in the levers 8 is provided with a nut 12 which forces the free end of the lever against the rim 3. By this construction it will be seen that the rim 3 is clamped and securely held between the flange 6 and levers 8, an enormous clamping pressure being obtained by the leverage exerted by the levers 8. It will also be noted that by tightening up the levers 8 the flange 7 is forced against the felly and further serves to hold the band 5 and flange 6 solidly in place. In removing the rim it is merely necessary to loosen the nuts 12 when the levers 8 can either be dropped down or swung around on the bolt 11 as a pivot.

It is obvious that variations in the form and details of construction might be employed without departing from the spirit of my invention.

In the modification illustrated in Fig. 4, the continuously engaging flange 6 is formed as an annular side plate 12 secured to the side of the wheel, the opposite side being provided with an annular plate 13 provided with lateral projections 14 upon which the clamping levers are fulcrumed. Also instead of being loosely fulcrumed, the levers might be pivotally fulcrumed to the side of the felly as indicated in Fig. 5 in which case the pivot of the lever seats on a suitably formed ledge in the projections at either side of the levers.

By the use of the term "felly" in the description and claims it is to be understood that any fixed rim or plate which is permanently secured to the outer ends of the spokes is meant, my invention not being limited to the use of the felly of the ordinary type, as instead of using the ordinary wooden felly, a metal rim might be employed and the rim-engaging flange and clamping levers secured to the sides of the spokes.

While I have shown and described a rim of the standard clencher type, it will be obvious that my invention is not limited to the use of this particular form of rim as any other form presenting suitable surfaces to be engaged and held by the centripetally projecting flange and clamping levers might be employed without departing from the spirit of my invention.

What I claim as my invention is:—

1. The combination with a tire-holding rim, a felly, a band secured to the periphery of said felly having one edge terminating in an outwardly projecting flange adapted to engage said rim on one side, the other edge terminating in a centripetally projecting flange bearing against the side of the felly, a plurality of projections forming ledges on said centripetally projecting flange, a plurality of clamping levers detachably secured to said felly and fulcrumed on said projections and clamping means passing loosely through said levers whereby the strain on said levers is transmitted to said points of fulcrum.

2. The combination of a tire-holding rim, a felly, an outwardly projecting flange secured to said felly adapted to continuously engage the upturned surface of said rim on one side, a plurality of lateral ledges on the side of said felly, a plurality of clamping levers loosely fulcrumed on said ledges and means loosely engaging said levers for applying pressure to the rim engaging end of said levers, said pressure being applied between said fulcrum and said rim engaging end.

3. In combination with a tire-holding rim, a felly, an annular band encircling the felly, one edge of the band outwardly flanged to bear against the side of the rim and the other edge inwardly flanged to bear against the side of the felly, a plurality of levers fulcrumed on the inwardly projecting flange at a distance from the periphery, and means secured to the felly and adjustably bearing on the levers between their fulcra and the periphery whereby to force the free ends of the levers against the side of the rim, substantially as described.

4. In combination with a tire-holding rim, a felly, an annular band encircling the felly, one edge of the band outwardly flanged to bear against the side of the rim and the other edge inwardly flanged to bear against the side of the felly, the inwardly projecting flange provided with a ledge, bolts secured to the felly and projecting laterally therefrom between the ledge and periphery, levers mounted on the bolts and having one end fulcrumed on the ledge and the other bearing against the rim, and nuts threaded on the bolts and engaging the levers whereby to press the outer ends of the same against the side of the rim, substantially as described.

5. The combination of a tire-holding rim, a felly, an annular Z-bar encircling the felly, one edge of the band outwardly flanged to bear continuously against one side of the rim and the other edge inwardly flanged to bear continuously against the opposite side of the felly, the inwardly projecting flange provided at intervals with outwardly facing ledges, bolts secured to the felly and projecting laterally therefrom radially in line between the ledges and periphery, slotted levers mounted on the bolts and having one end fulcrumed on the ledges and the other bearing against the rim, and nuts threaded on the bolts and engaging the levers whereby to press the outer ends of the same against the side of the rim, substantially as described.

Signed at New York in the county of New York and State of New York this 3d day of March A. D. 1908.

HUGO C. GIBSON.

Witnesses:
C. F. TISCHNER, Jr.,
LILLIAN BLOND.